March 14, 1933.     H. D. FISK     1,901,092
CORN HARVESTING MACHINE
Filed Oct. 20, 1930     3 Sheets-Sheet 1

INVENTOR.
Henry Dan Fisk
BY
ATTORNEY.

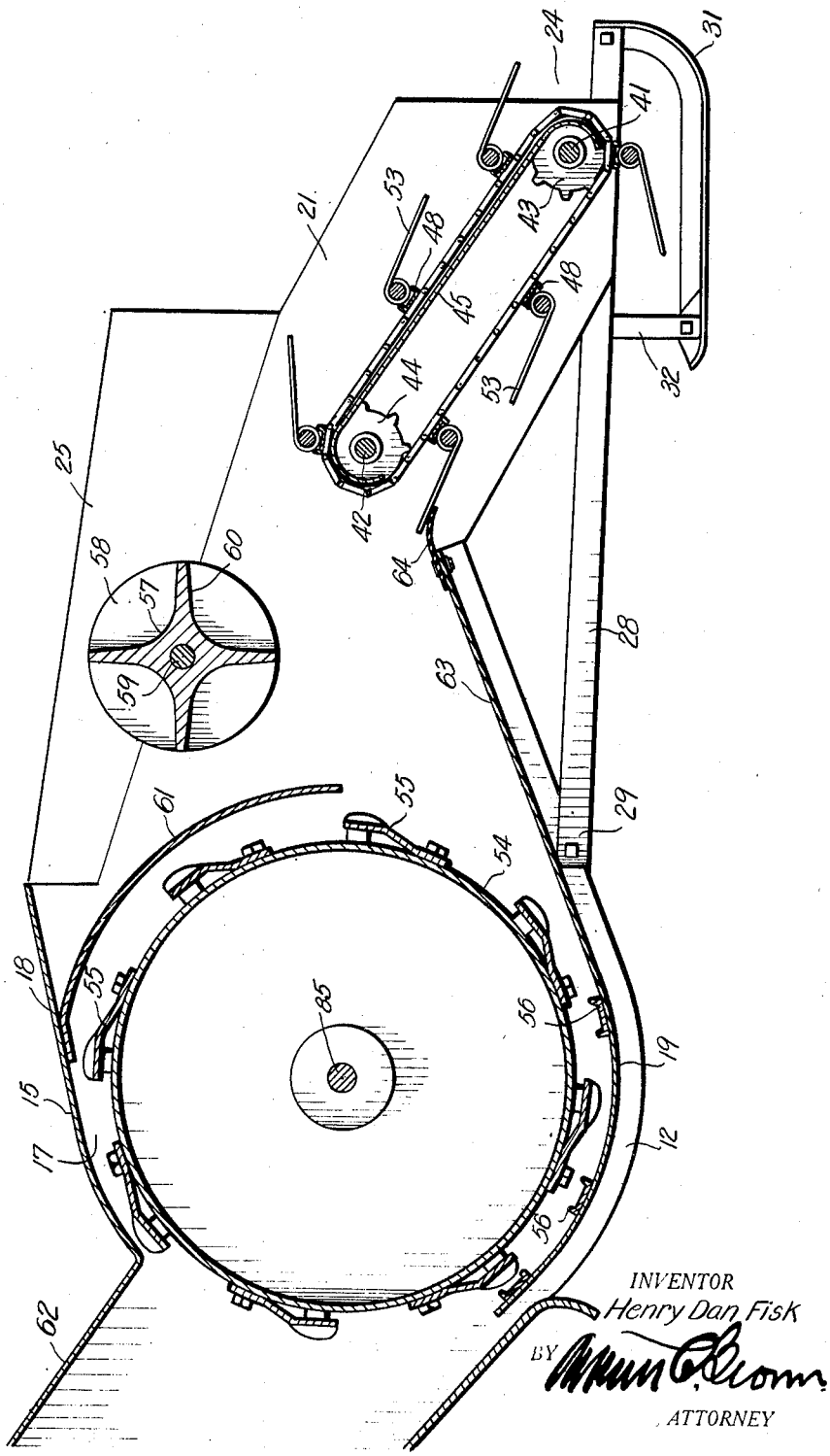

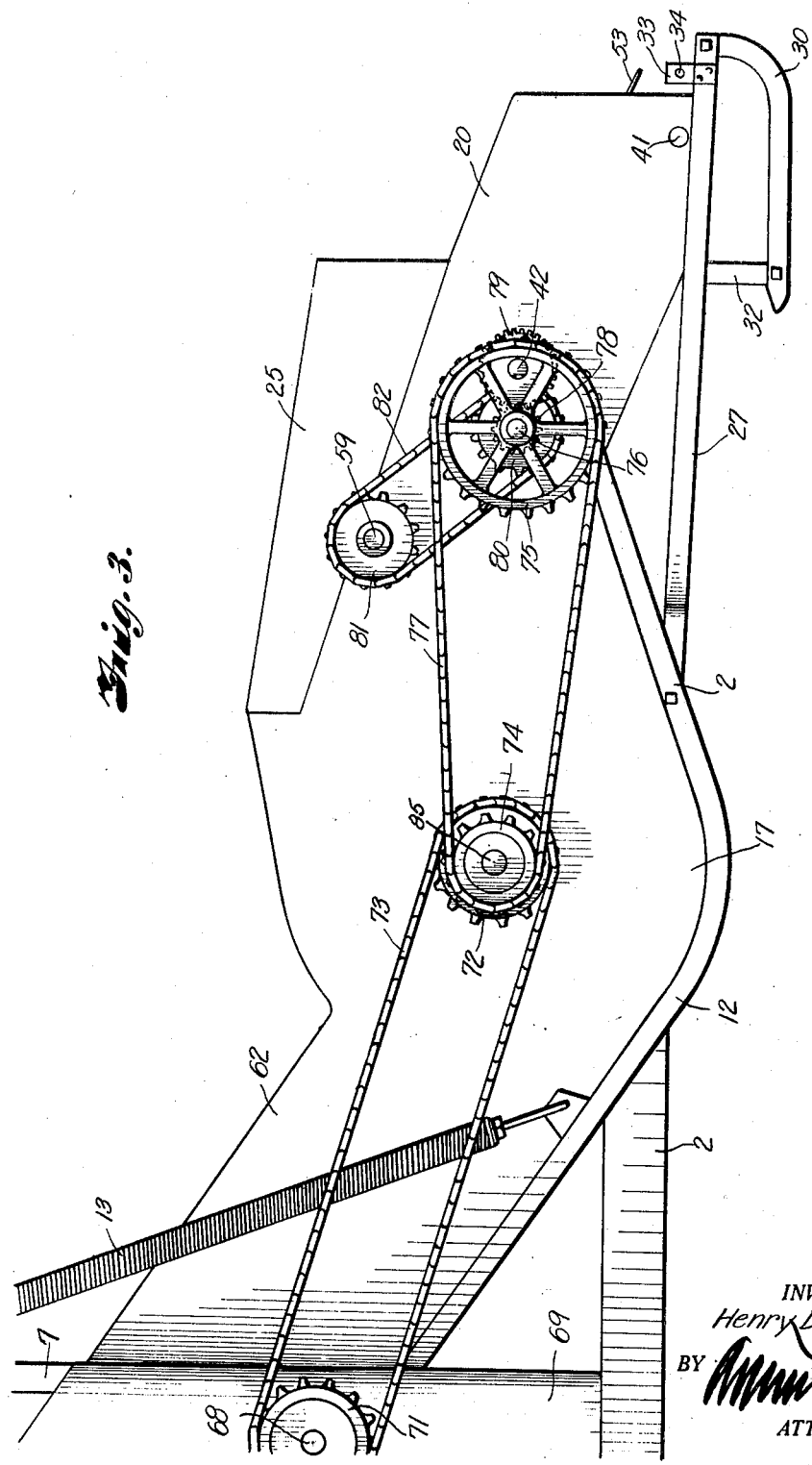

Patented Mar. 14, 1933

1,901,092

UNITED STATES PATENT OFFICE

HENRY DAN FISK, OF INDEPENDENCE, MISSOURI, ASSIGNOR, BY MESNE ASSIGNMENTS, TO GLEANER HARVESTER CORPORATION, OF INDEPENDENCE, MISSOURI, A CORPORATION OF DELAWARE

CORN HARVESTING MACHINE

Application filed October 20, 1930. Serial No. 489,910.

My invention relates to harvesting machines, and particularly to machines for harvesting maize crops, such as corn and the like, which are cut and left in windrows for curing before the crop can be finally harvested; the principal object of the invention being to provide a machine which will gather the crop from the rows after it has been cured, and which will thresh the grain and separate it from the stover.

In accomplishing these and other objects of my invention, I have provided improved details of structure, the preferred form of which is illustrated in the accompanying drawings, wherein:

Fig. 2 is a longitudinal vertical sectional view through the pick-up mechanism and threshing or shelling cylinder of the machine.

Fig. 3 is a side elevational view of the parts shown in Fig. 2, particularly illustrating the drives for operating the shelling cylinder and pick-up mechanism.

Figure 1:
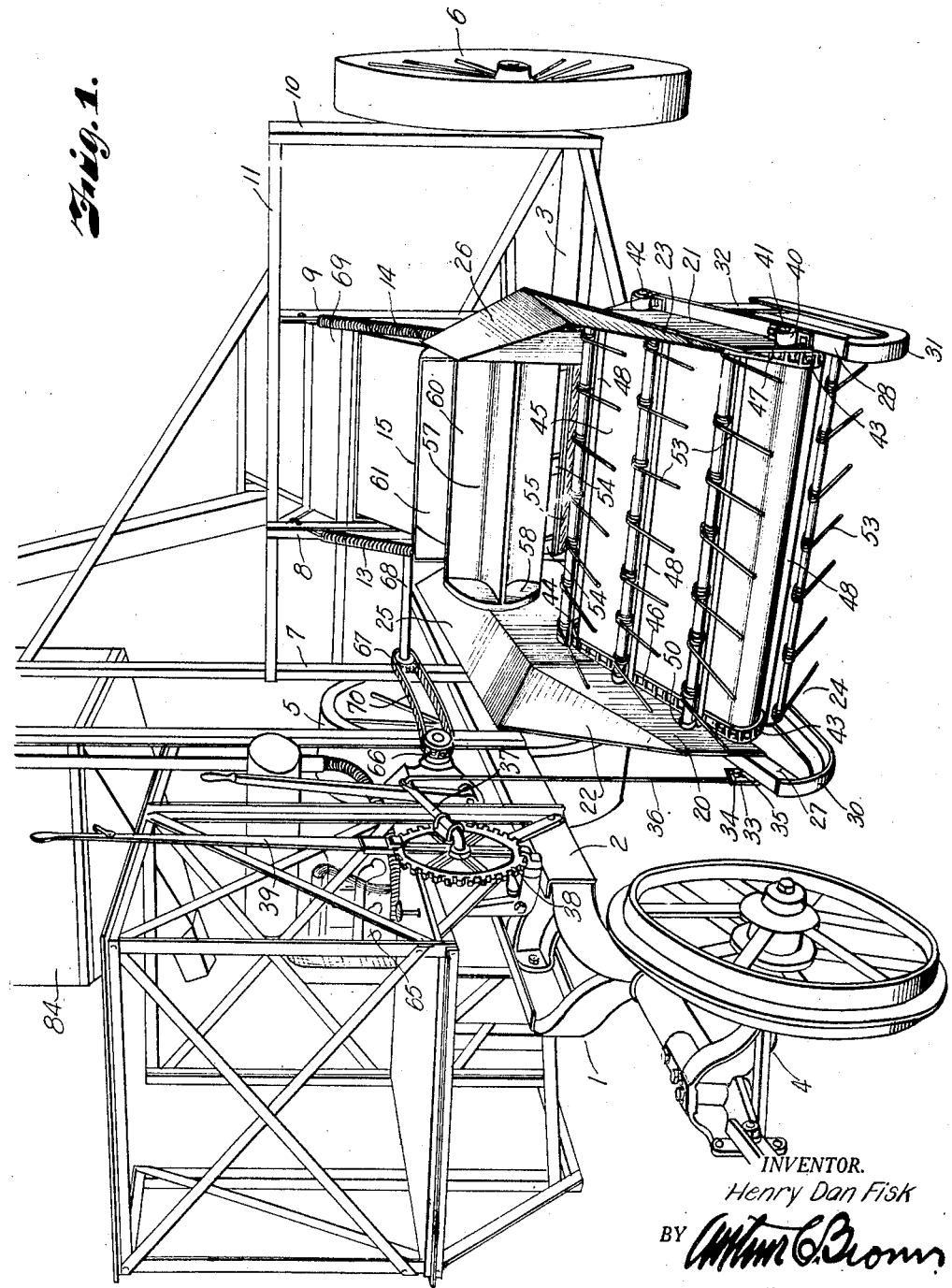
Fig. 1 is a perspective view of a harvesting machine constructed in accordance with my invention.

Referring more in detail to the drawings:

1 designates the main frame of the machine including a longitudinally extending portion 2 and a lateral portion 3 extending from the longitudinal portion substantially midway of its length.

The frame 1 is carried on an ordinary steering truck 4 pivotally supporting the forward end of the longitudinal portion of the frame, a main wheel 5 supporting the rear end of the longitudinal portion of the frame at a point in substantial alignment with the laterally extending portion 3, and a side wheel 6 aligning with the wheel 5 and supporting the frame at the outer end of the portion 3. The steering truck 4 is adapted to be connected with a tractor or other suitable draft means (not shown), for drawing the machine over the field and along the rows to be gathered.

Extending upwardly from the lateral portion 3 of the frame are spaced standards 7, 8, 9 and 10 connected at their upper ends by a tying member 11. Pivoted to the standards 8 and 9 are arms 12 having upwardly curved forward ends for seating a cylinder housing and supporting a pick-up mechanism later described. The arms 12 are balancingly supported from the standards 8 and 9 by springs 13—14, as best illustrated in Figs. 1 and 3.

The cylinder housing designated 15 includes end walls 16 and 17 connected by an upper curved hood portion 18 and a lower curved concave plate 19. Extending forwardly of the end walls 16 and 17 are spaced wings 20 and 21 inclined outwardly and terminating in side boards 22 and 23 spaced apart a greater distance than the end walls of the housing to accommodate a pick-up mechanism designated 24. The wings 20 and 21 and the side boards 22 and 23 are provided on their upper edges with laterally extending inclined flanges 25 and 26.

Fixed to the side boards 22 and 23 are angle arms 27 and 28 having rearwardly extending end portions curved inwardly to connect with the arms 12 as at 29, and fixed to the forward ends of the angle arms are ground runners 30 and 31 having their curved front ends secured to the forward ends of the angle arms and their rear ends braced by bars 32 connecting the runners and angle arms as best shown in Figs. 1 and 2.

In order to pivot the arms 12 to raise and lower the pick-up unit with relation to the ground, the end of the arm 27 is provided with an ear 33 having an opening 34 for receiving the hook end 35 of a link 36 which connects with an arm 37 of a ratchet wheel 38. The ratchet wheel is carried on the forward portion of the main frame and is actuated by a lever 39 pivoted axially of the wheel and provided with a pawl, whereby the lever may be rocked to actuate the ratchet wheel in raising and lowering the pick-up mechanism including the cylinder housing 15.

Rotatably mounted at the forward end of the side boards, in suitable bearings 40 supported by the arms 27 and 28, is a shaft 41, and spaced rearwardly and at a higher elevation than the shaft 41 is a complementary shaft 42 rotatably mounted in the side boards in substantially horizontal alignment with a cylinder shaft 85.

Fixed to the shafts adjacent the side board are pairs of sprockets 43 and 44, respectively, and operating thereover and across an inclined table 45 are chain belts 46 and 47.

Connected at spaced intervals by channel bars 48 supported at the ends of the channel bars are brackets 50 and 51 for mounting rods 52 carrying a plurality of inclined teeth 53 adapted to be moved under the table for gathering the stalks from the row and to convey them across the table for discharge into the cylinder housing.

Rotatably mounted in the cylinder housing on the shaft 85 is a threshing and shelling cylinder including spaced disks 54 connected by rasp bars 55 which are operable over channel-shaped concave bars 56 supported by the concave 19 forming the bottom of the cylinder housing.

In order to prevent the long stalks from being discharged from the conveyor onto the top of the cylinder housing, I provide a feeder or beater 57 for engaging the ends of the stalks to direct them downwardly toward the concave so that they will be readily engaged and drawn into the cylinder. The feeder 57 preferably comprises end disks 58 fixed to a shaft 59 and connected by a plurality of radially extending vanes 60, the shaft 59 being rotatably mounted in the wings 20 and 21 similar to the shaft of the pick-up conveyor.

I also provide a curved guard 61 for covering the upper portion of the cylinder and which is secured at the ends to the end walls of the cylinder housing, and at its upper edge to the hood 15. The discharge side of the cylinder housing is provided with a chute 62 for conveying the grain into the separator mechanism which may be of any standard construction.

The concave plate 19 is preferably extended upwardly toward the pick-up conveyor as at 63, and is provided with a flexible extension 64 for closing the space between the end of the extension 63 and the ends of the pick-up teeth, to prevent the stalks or ears of corn from dropping therebetween or being carried over by the conveyor.

An internal combustion engine 65 is supported on the main frame of the machine and is provided with a sprocket 66 to drive a complementary sprocket 67 on a lateral shaft 68 supported by the thresher housing 69 in alignment with the pivotal connection of the arms 12, the sprocket being driven by a chain 70.

Fixed on the shaft 68 adjacent the separator housing is a sprocket 71, and running thereover and over a similar sprocket 72 on the projecting end of the cylinder shaft is a chain 73 to drive the cylinder. Also fixed on the cylinder shaft adjacent the sprocket 72 is a sprocket 74 for driving a sprocket 75 on a stub shaft 76 supported on the wing 20, the sprocket 75 being driven from the sprocket 74 by a chain 77.

Mounted on the stub shaft 76 is a spur gear 78 and meshing therewith is a spur gear 79 fixed to the pick-up shaft 38 for actuating the pick-up conveyor. Also mounted on the stub shaft in driving relation with the gear 78 is a sprocket 80 for driving a sprocket 81 on the feeder shaft 59 by a chain 82 running over the respective sprockets.

In operating a machine constructed and assembled as described, the machine is drawn through the field with the pick-up mechanism travelling over the row of cut corn. The lever 39 is operated to allow the runners to rest on the ground so that the teeth 53, as they emerge from under the forward end of the table 41, will engage the stalks and lift them onto the table for discharge into the shelling cylinder.

Should any of the stalks be directed upwardly toward the guard 61, the feeder 58 will divert the ends downwardly under the guard so that the stalks will be readily engaged by the cylinder and discharged through the concave 56 to effect shredding the stalks and shelling the grain, which is then discharged into the separating unit of the machine where the grain is separated from the stover and elevated into a bin 84 supported from the main frame of the machine above the wheel 5, and the fodder is discharged into a windrow from the rear end of the separator housing.

From the foregoing it is apparent that I have provided a simple constructed machine wherein the stalks are picked up and discharged directly into the threshing cylinder without the use of intermediate or auxiliary conveyors.

What I claim and desire to secure by Letters Patent is:

1. In a machine of the character described including a frame, a cylinder and pick-up conveyor housing pivotally supported by the frame, a threshing and shelling cylinder in the cylinder housing, and a pick-up mechanism supported in the front of said housing for picking up and discharging grain directly into the cylinder.

2. In a machine of the character described including a frame, a pair of forwardly extending arms pivotally supported from the frame, runners supporting the forward ends of the arms, a cylinder housing supported by the arms, a threshing and shelling cylinder in the cylinder housing, a pick-up mechanism supported in the housing in front of the cylinder for picking up and discharging grain into the cylinder, and means positioned in the housing ahead of said cylinder for directing the grain into the cylinder.

3. In a machine of the character described, a frame, a cylinder housing pivotally supported from the frame, a cylinder in the housing, wings extending forwardly from the cylinder housing, a conveyor operable between the wings, and teeth on the conveyor for picking up grain and delivering it into the cylinder.

4. In a machine of the character described, a frame, a cylinder housing pivotally supported by the frame, a cylinder in the housing, wings extending forwardly from the cylinder housing, a rearwardly and upwardly inclined conveyor operable between the wings, teeth on the conveyor for picking up stalks and delivering them into the cylinder, and means between the cylinder and the conveyor for bending the ends of the stalks downwardly toward the cylinder.

5. In a machine of the character described, a frame, a cylinder housing supported by the frame, a cylinder in the housing, wings extending from the cylinder housing, a concave positioned below the cylinder and having an upwardly and forwardly inclined portion, spaced shafts rotatably mounted between the wings, sprockets on the shafts, chains operable over the sprockets, rods connecting the chains, teeth on the rods for picking up grain and discharging it into the cylinder, and a flexible extension on the extending portion of the concave for engaging said teeth to prevent carrying over of grain by said teeth.

6. In a machine of the character described, a main frame, a sub-frame pivoted to the main frame, a threshing cylinder carried by the sub-frame, a pick-up conveyor supported by the sub-frame in alignment with and ahead of the cylinder for picking up and discharging grain into the cylinder, and means for actuating the sub-frame on its pivot to raise and lower the pick-up conveyor.

7. In a machine of the character described, a main frame, a separator mechanism on the main frame, a cylinder and pick-up conveyor housing pivotally supported from the main frame and having a chute portion communicating with the separator, a cylinder rotatably mounted in the housing, a concave associated with the cylinder and having an upwardly and forwardly inclined shelf portion, a toothed pick-up conveyor operably supported in the housing for picking up grain stalks and feeding them onto the inclined portion of the concave, and a rotatable member positioned between the cylinder and the pick-up conveyor for bending the ends of the grain stalks downwardly onto the shelf portion of the concave and through said cylinder for delivery into the separator.

8. In a machine of the character described, a main frame, a separator mechanism on the main frame, a cylinder and pick-up conveyor housing pivotally supported from the main frame and having a chute portion communicating with the separator, a cylinder rotatably mounted in the housing, a concave associated with the cylinder and having an upwardly and forwardly inclined shelf portion, a toothed pick-up conveyor operably supported in the housing for picking up grain stalks and feeding them onto the inclined portion of the concave, a curved guard member extending across the housing and terminating short of the shelf portion of the concave to form a passage for the grain stalks between the cylinder and concave, and a rotatable member positioned in the housing between the pick-up conveyor and the curved guard for bending the ends of the grain stalks toward said passage.

In testimony whereof I affix my signature.

HENRY DAN FISK.